J. K. LOCKWOOD.
CIRCULAR-SAW.
No. 7,753. Reissued June 19, 1877.
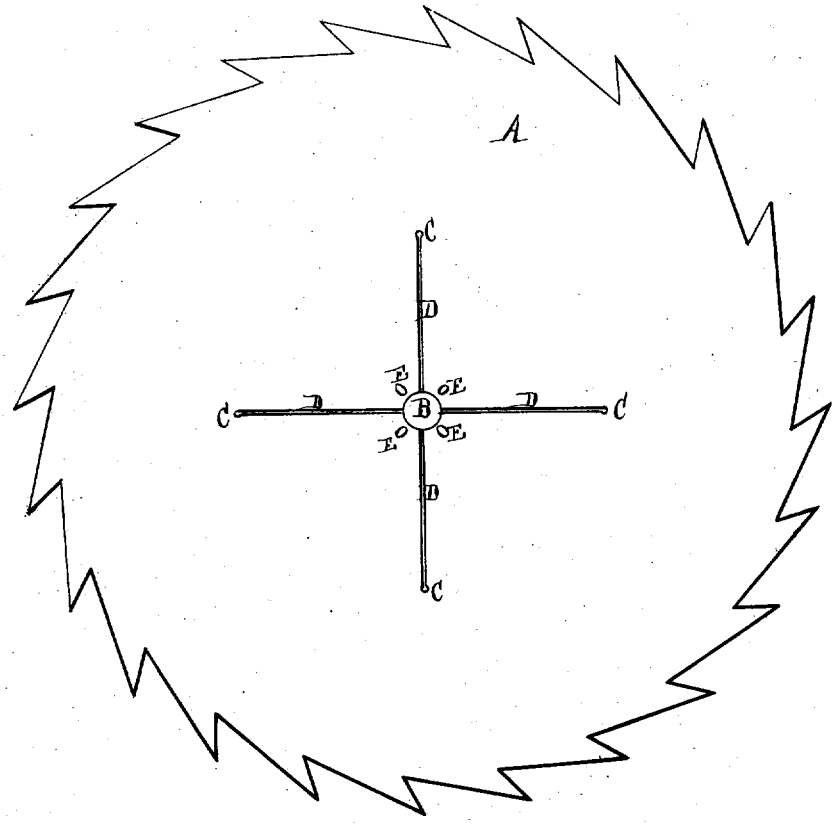
Attest:
Charles J. Hunt
Edward Barthel.
Inventor:
Jas. K. Lockwood
By Atty
Thos. S. Sprague
N. PETERS, PHOTO-LITHOGRAPHER, WASHINGTON, D. C.

UNITED STATES PATENT OFFICE.

JAMES K. LOCKWOOD, OF ALPENA, MICHIGAN.

IMPROVEMENT IN CIRCULAR SAWS.

Specification forming part of Letters Patent No. 70,728, dated November 12, 1867; reissue No. 7,753, dated June 19, 1877; application filed May 16, 1876.

*To all whom it may concern:*

Be it known that I, JAMES K. LOCKWOOD, of the village and county of Alpena, and State of Michigan, have invented a new and useful Improvement in Circular Saws; and I do declare that the following is an accurate description thereof, reference being had to the accompanying drawings, and to the letters of reference marked thereon, and making a part of this specification.

The nature of my invention relates to certain improvements in the construction of circular saws, and its object is to prevent the saw from buckling or running unevenly by equalizing the contraction and expansion of the saw under the varying temperatures to which it is subjected when in use.

In the drawings, A represents a circular saw, provided with the usual eye B, by means of which the saw is suspended on a suitable mandrel. From this eye B there are cut a series of radial slots, D, terminating at any desired point between the eye and the periphery of the saw. As in the rapid rotation of the saw, it might occur that the saw would crack from the termination of these slots to the periphery, a series of circular holes, C, one at the termination of each slot, are punched in the saw to prevent such cracks. E E are slotted holes to receive dowel-pins, which pass from the permanent collar on the mandrel through the saw into the loose collar on the outside of the saw when hung. These slotted holes, instead of circular ones, will allow of an expansion and contraction of the saw from the center. The eye B should be made a trifle larger than the mandrel upon which it is intended to run, to still further allow for contraction and expansion of the saw.

A saw constructed as above described will never become wavy in its motion, and will never buckle, as in heating and cooling the expansion and contraction will be taken up and neutralized by the slots, the slotted holes, and the enlargement of the eye through which the mandrel passes.

What I claim as my invention, and desire to secure by Letters Patent, is—

1. The plain and rectilinear circular saw A, constructed with slots having parallel sides, extending from the eye toward the periphery for the purpose of preventing the buckling of the saw by expansion, substantially as set forth.

2. A circular saw constructed with more or less slots, extending from the eye toward the periphery, and terminating in holes punched in said saw, substantially as and for the purposes described.

3. A circular saw constructed with more or less slots, extending from the eye toward the periphery, in combination with the slotted holes near the eye, substantially as and for the purposes specified.

4. A circular saw constructed with more or less slots, extending from the eye toward the periphery, the holes at the termination of the slots, and the slotted holes near the eye, substantially as and for the purposes set forth.

J. K. LOCKWOOD.

Witnesses:
ALEX. R. MCDONALD,
JNO. N. KELLEY.